United States Patent
McCain et al.

(10) Patent No.: US 11,596,866 B1
(45) Date of Patent: Mar. 7, 2023

(54) METHOD TO USE RECOGNITION OF NEARBY PHYSICAL SURFACES TO GENERATE NPC REACTIONS TO EVENTS

(71) Applicants: Sony Group Corporation, Tokyo (JP); Sony Corporation of America, New York, NY (US)

(72) Inventors: Robert M. McCain, Chandler, AZ (US); Tsubasa Tsukahara, Los Angeles, CA (US)

(73) Assignees: Sony Group Corporation, Tokyo (JP); Sony Corporation of America, New York, NY (US)

( * ) Notice: Subject to any disclaimer, the term of this patent is extended or adjusted under 35 U.S.C. 154(b) by 0 days.

(21) Appl. No.: 17/488,249

(22) Filed: Sep. 28, 2021

(51) Int. Cl.
*A63F 13/45* (2014.01)
*A63F 13/56* (2014.01)
*A63F 13/577* (2014.01)

(52) U.S. Cl.
CPC ............ *A63F 13/56* (2014.09); *A63F 13/577* (2014.09); *A63F 2300/643* (2013.01); *A63F 2300/6607* (2013.01)

(58) Field of Classification Search
CPC .......... A63F 13/45; A63F 13/50; A63F 13/52; A63F 13/525; A63F 13/5252; A63F 13/55; A63F 13/56; A63F 13/57; A63F 13/70; A63F 2300/203; A63F 2300/30; A63F 2300/60; A63F 2300/65; A63F 2300/6607; A63F 2300/6623; A63F 2300/6646; A63F 2300/6661; A63F 2300/6669; A63F 2300/6684
See application file for complete search history.

(56) References Cited

U.S. PATENT DOCUMENTS

| | | | |
|---|---|---|---|
| 10,255,302 B1* | 4/2019 | Cosic | G06F 3/0481 |
| 10,928,973 B2 | 2/2021 | Shuster | |
| 2011/0098114 A1* | 4/2011 | Ishida | A63F 13/56 |
| | | | 463/43 |
| 2013/0196759 A1* | 8/2013 | Kim | A63F 13/533 |
| | | | 463/31 |
| 2015/0302665 A1* | 10/2015 | Miller | G02B 27/0093 |
| | | | 345/419 |
| 2016/0104452 A1* | 4/2016 | Guan | A63F 13/213 |
| | | | 345/633 |

(Continued)

FOREIGN PATENT DOCUMENTS

| | | |
|---|---|---|
| EP | 3459071 | 3/2019 |
| WO | WO-2020146132 A1 | 7/2020 |

*Primary Examiner* — Omkar A Deodhar
(74) *Attorney, Agent, or Firm* — Trellis IP Law Group, PC

(57) ABSTRACT

A method to generate an appropriate reaction, by an NPC in an XR game, to a significant event in the game includes: compiling a record from a previously generated SMM of surfaces in the XR space, categorizing the surfaces; after the game begins, tracking in real time physical surroundings of the NPC, allowing 3D positions of the NPC relative to nearby physical surfaces to be continuously determined; and events occurring in the game, allowing detection of any event deemed to be significant. For each detected event deemed significant, occurring at a corresponding event time, an appropriate action is determined for the NPC to carry out in response, partly based on whether the NPC is positioned close to a physical surface at the event time, and the NPC is directed to carry out the appropriate action.

20 Claims, 5 Drawing Sheets

(56) References Cited

U.S. PATENT DOCUMENTS

| | | |
|---|---|---|
| 2017/0270711 A1 | 9/2017 | Schoenberg |
| 2019/0355170 A1* | 11/2019 | Chen ........................ G06F 3/147 |
| 2019/0385379 A1* | 12/2019 | Woo .................... G01C 21/3626 |
| 2020/0139240 A1* | 5/2020 | Hrincár et al. .......... A63F 13/57 |
| 2021/0134051 A1* | 5/2021 | Hennessy ............. G06T 15/205 |

\* cited by examiner

METHOD TO USE RECOGNITION OF NEARBY PHYSICAL SURFACES TO GENERATE NPC REACTIONS TO EVENTS

CROSS REFERENCE TO RELATED APPLICATIONS

This application is related to the following applications:

U.S. patent application Ser. No. 17/488,245, entitled "METHOD FOR PREDEFINING IN AN XR SPACE AN ENTRYWAY CORRESPONDING TO A REAL ENTRYWAY", filed on Sep. 28, 2021;

U.S. patent application Ser. No. 17/488,247, entitled "METHOD FOR PREDEFINING A VIRTUAL ENTRYWAY AT A VIRTUAL BOUNDARY OF AN XR SPACE", filed on Sep. 28, 2021;

U.S. patent application Ser. No. 17/488,248, entitled "METHOD FOR PREDEFINING ACTIVITY ZONES IN AN EXTENDED REALITY (XR) ENVIRONMENT", filed on Sep. 28, 2021;

U.S. patent application Ser. No. 17/488,250, entitled "METHOD FOR QUASI-RANDOM PLACEMENT OF VIRTUAL ITEMS IN AN EXTENDED REALITY (XR) SPACE", filed on Sep. 28, 2021;

U.S. patent application Ser. No. 17/488,251, entitled "METHOD TO REGULATE JUMPS AND FALLS BY PLAYABLE CHARACTERS IN XR SPACES", filed on Sep. 28, 2021;

U.S. patent application Ser. No. 17/488,253, entitled "METHODS FOR PREDEFINING VIRTUAL STAIRCASES CONNECTING PLATFORMS IN EXTENDED REALITY (XR) ENVIRONMENTS", filed on Sep. 28, 2021;

and U.S. patent application Ser. No. 17/488,254, entitled "METHOD TO IMPROVE USER UNDERSTANDING OF XR SPACES BASED IN PART ON MESH ANALYSIS OF PHYSICAL SURFACES", filed on Sep. 28, 2021;

each of which are hereby incorporated by reference as if set forth in full in this application for all purposes.

BACKGROUND

While virtual reality (VR) technologies aim to immerse a user in artificially generated or synthesized environments inspired by real or imaginary environments, augmented reality (AR) technologies superimpose synthesized elements onto a real environment to which the user is exposed. The term mixed reality (MR) is used to refer to technologies that combine VR and AR, allowing a user to interact in real time with real and synthesized elements. More generally, the term extended reality or XR is used to encompass all three terms, although it is often (as in this disclosure) used interchangeably with MR.

Games, marketing and training are among the main applications for XR technology. This disclosure will focus on XR games, but it should be appreciated that there are many other applications for XR technology, including, for example, product marketing, and skills training, and many of the ideas discussed herein could be applied to any of these areas without departing from the spirit or scope of the invention.

A primary goal of the game developer is to provide the user with as fully immersive an experience as possible, in which the user can interact naturally with either real or synthesized (virtual) elements, and in which the virtual characters or objects behave "naturally" even though the real elements making up the physical environments in which the user may want to play—in different rooms in their home, or office, for example—will normally be completely unknown to the game developer. In currently available XR applications, this goal is far from being achieved.

Consider, for example, a typical case of a game designed to be played in a defined XR space contained within a larger, real environment containing items of furniture and structural elements like kitchen counters and walls. The game may involve virtual characters playing subsidiary roles in the action of the game, but in current games, these characters do not interact in realistic ways with the real elements present, apart from, at most, being positioned in open spaces between them. If, for example, a dramatic event occurs in the game, such as a virtual raging monster suddenly entering the XR space, an NPC may be present in a position to apparently witness it, but having a very limited range of possible reactions—relatively static reactions like a change of facial expression, or shouting are easy to arrange, but ones involving significant motion, like backing away towards a wall but stopping short of it at a reasonable distance, or crouching down to hide under a table, may not be; even if the risk of actually overlapping with real physical structures could be minimized, by limiting NPC movement to previously mapped open spaces.

Another less dramatic set of examples involves the presence of features known in the field as "activity zones", regions in which normal, everyday activities typically happen. An empty sofa is one such example, where it might seem natural for the character to approach and lie down upon it; another is an empty chair next to an open tabletop, where it might seem natural to walk up to the chair, sit down, swivel around, and lean elbows onto the tabletop. Currently available XR games do not provide for such reactions.

These limitations obviously do not aid the illusion the developer is trying to create, of even NPCs being "real" entities, human or not, who behave in ways a real character might, such as by running to a hiding place in fear at the sight of a monster, lying down on a real sofa instead of just walking by it, sitting on a real chair, placing a virtual coffee mug on a real counter, playing a game of table tennis with another character already at the table, and so on.

There is therefore a need for methods and systems operable during use of an XR game (or other application, such as a navigation or shopping app) that can enable an NPC to interact in real time with real elements in any given XR space in believable ways, in the course of reacting appropriately to significant events occurring therein. It would of course be desirable for such methods and systems to leverage currently available hardware and software applications as appropriate, and to be computationally efficient, using minimal resources in time and computing power, to perform necessary categorization and tracking of nearby physical surfaces, to detect significant events worthy of reaction, and to select and put such reactions into effect.

SUMMARY

Embodiments generally relate to methods and systems for generating an appropriate action, by a non-player character (NPC) in a game being played in an XR space, in response to a significant event occurring in the game.

In one embodiment, the method comprises: compiling a record from a previously generated spatial mapping mesh (SMM) of surfaces of physical elements in the XR space, categorizing the surfaces into a first set of categories; after the game begins, tracking in real time: physical surroundings of the NPC in real time, allowing 3D positions of the NPC relative to physical surfaces positioned within a first range of vector distances from the NPC to be continuously determined; and events occurring in the game, allowing detection of any event deemed to be significant. For each detected event deemed significant, occurring at a corresponding event time: an appropriate action is determined for the NPC to carry out in response to the detected significant event, based in part on whether the NPC is positioned within the first range of vector distances from a physical surface at the event time; and the NPC is directed to carry out the appropriate action.

In another embodiment, a system comprises: one or more processors; and logic encoded in one or more non-transitory media for execution by the one or more processors and when executed operable to: compile a record from a previously generated spatial mapping mesh (SMM) of surfaces of physical elements in the XR space, categorizing the surfaces into a first set of categories; after the game begins, track in real time: physical surroundings of the NPC in real time, allowing 3D positions of the NPC relative to physical surfaces positioned within a first range of vector distances from the NPC to be continuously determined; and events occurring in the game, allowing detection of any event deemed to be significant. For each detected event deemed significant, occurring at a corresponding event time, an appropriate action is determined for the NPC to carry out in response to the detected significant event, based in part on whether the NPC is positioned within the first range of vector distances from a physical surface at the event time; and the NPC is directed to carry out the appropriate action.

DETAILED DESCRIPTION OF EMBODIMENTS

A further understanding of the nature and the advantages of embodiments disclosed herein may be realized by reference of the remaining portions of the specification and the attached drawings.

Figure 1:
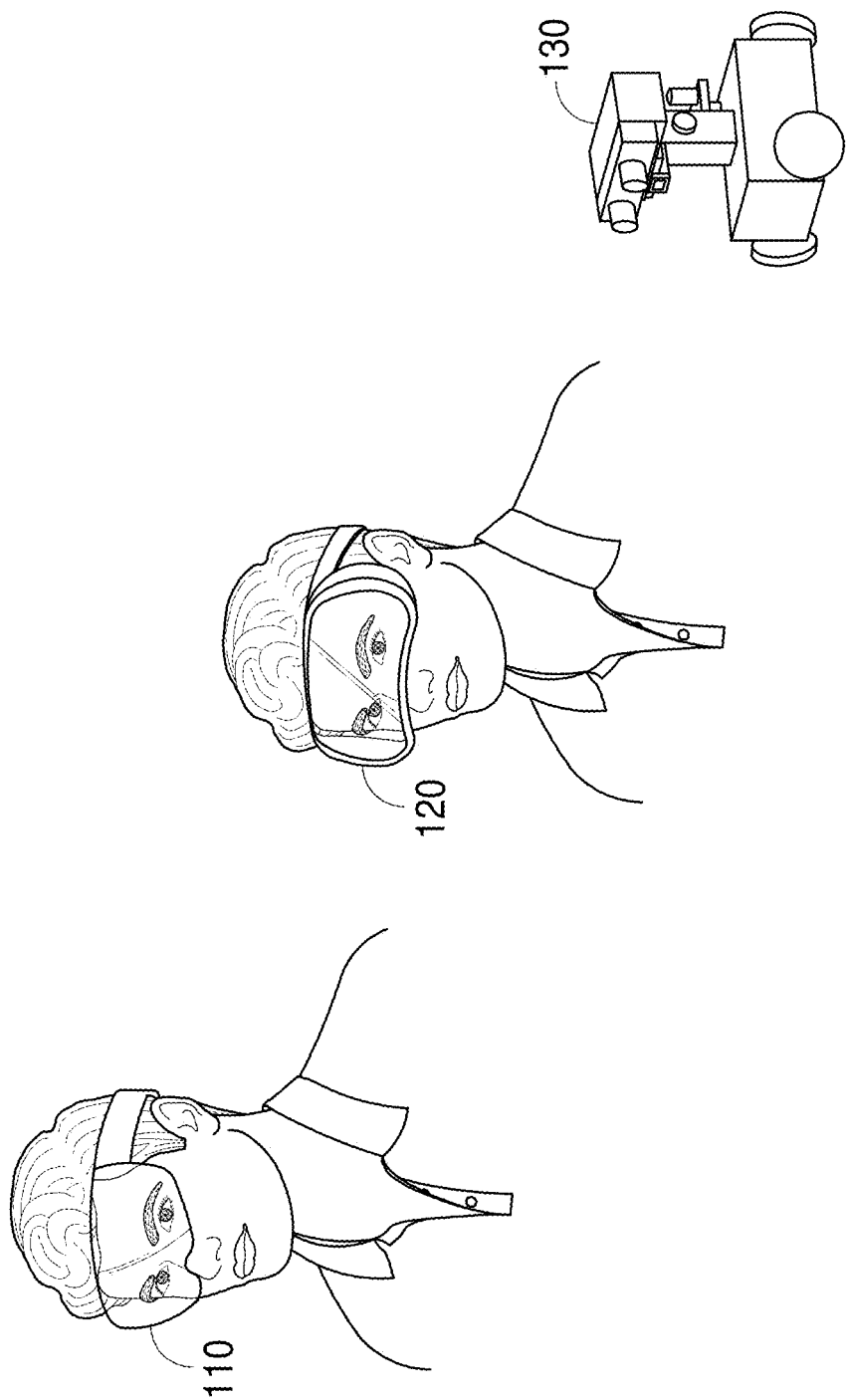
FIG. 1 (prior art) shows devices designed to generate mapping meshes that may be used in some embodiments.

Spatial mapping meshes (SMMs) may be generated by commercially available devices manufactured by gaming and other electronic companies. The devices may be head mounted, carried in the hand, or simply deployed (for example in the form of a robot) by a user to move autonomously around the space of interest, gathering data. Technologies such as e.g., LIDAR, ultrasound scanning, image analysis etc. for creating such meshes are well known and will not be discussed further herein. FIG. 1 shows two head mounted sensing and display devices, 110 and 120, and a robotic device 130, as examples of currently available devices by which SMMs can be generated. In some cases, the same devices used to generate the SMM is also used subsequently to display the resulting XR space, in which the user plays the game.

A typical SMM provided by such a device is a 3D representation, in the form of enormous numbers (tens or hundreds of thousands) of relatively small 2D polygons, of all visible and tangible surfaces in a given environment, such as within a house, in advance of the user commencing an XR game in a part of that environment, such as within one room of that house. By detecting and showing surfaces of all the physical elements within the room of interest, open spaces between those elements may, of course, be inferred.

An SMM of a given XR space may also be used to determine and predefine activity zones in the space, for example by using embodiments of methods and system disclosed in co-pending U.S. Patent Application entitled "Method for predefining activity zones in an extended reality (XR) environment", referenced above, or by using pre-installed AR markers (2D barcodes) that are associated with particular activities. An activity zone in an XR space may be defined as a spatial region including one or more surfaces of one or more physical elements, where there is an intrinsic natural association between that region and one or more activities that a character would be likely to perform there.

Figure 2:
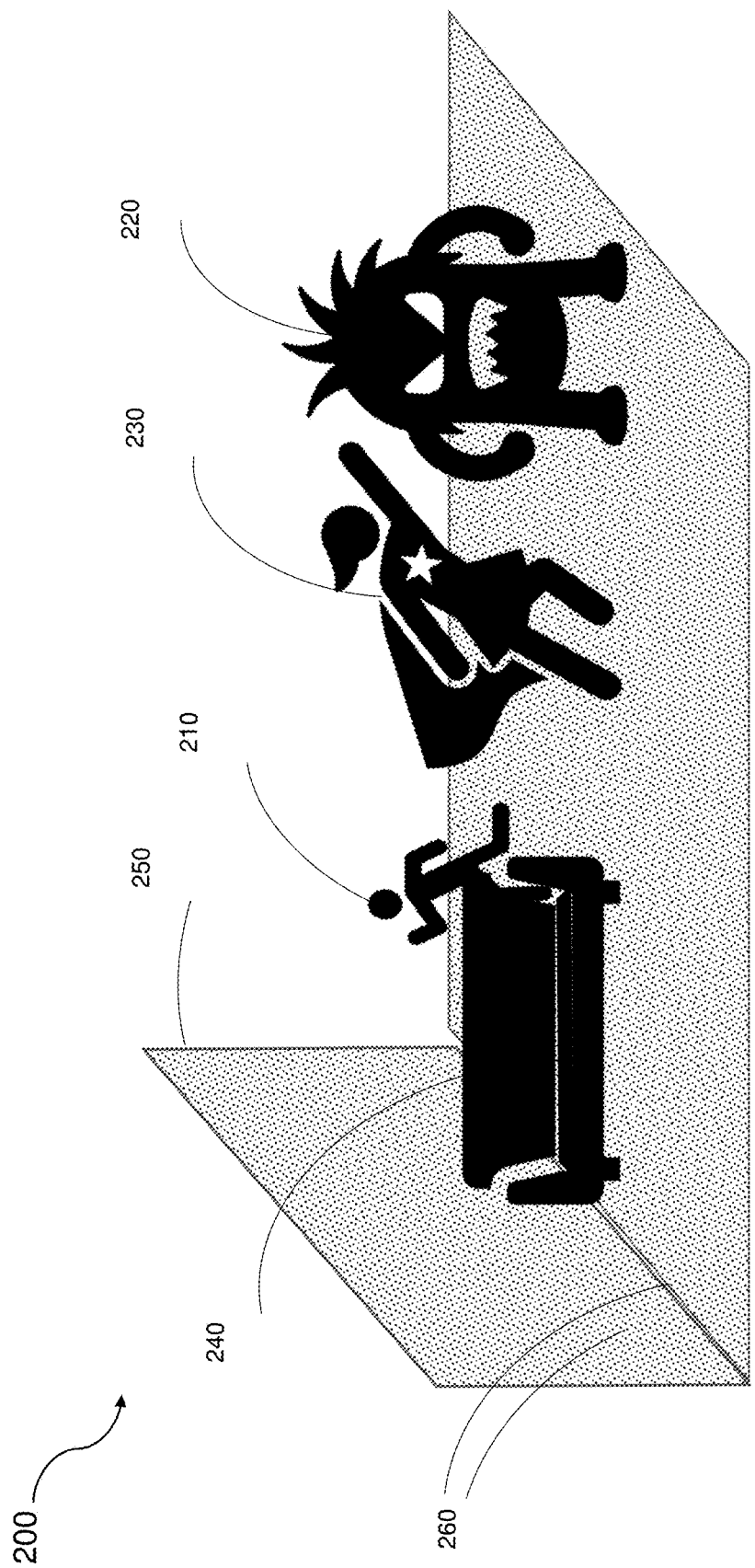
FIG. 2 illustrates an example of an XR space in which an NPC is seen reacting to a significant event in a way that involves taking the presence of nearby real elements into account, according to some embodiments.

FIG. 2 illustrates a very simple example of an XR space, a room, in which an embodiment of the present invention is applied in the course of a game. Hatching is shown on the wall surface and the floor of the room, representing the spatial mapping mesh SMM 260 which as noted above would actually include all exposed surfaces of physical elements in the room; only these two portions are shown for simplicity.

The figure shows NPC 210 reacting to the sudden appearance of a monster 220. While a heroic FIG. 230—probably a user controlled character—engages in battle, according to the rules of the game, the presumption behind this embodiment is that a minor, background FIG. 210 might reasonably be expected to run and hide between the back of a nearby piece of furniture which is actually present in the room, in this case a sofa 240, and a wall behind it, in this case the left hand wall 250. Seeing this sort of reaction may be quite entertaining to the user, helping maintain the illusion of reality! Another possible reaction (not shown) might be for the NPC to grab a virtual weapon from a nearby real tabletop and support the heroic figure; many others may be envisaged.

Figure 3:
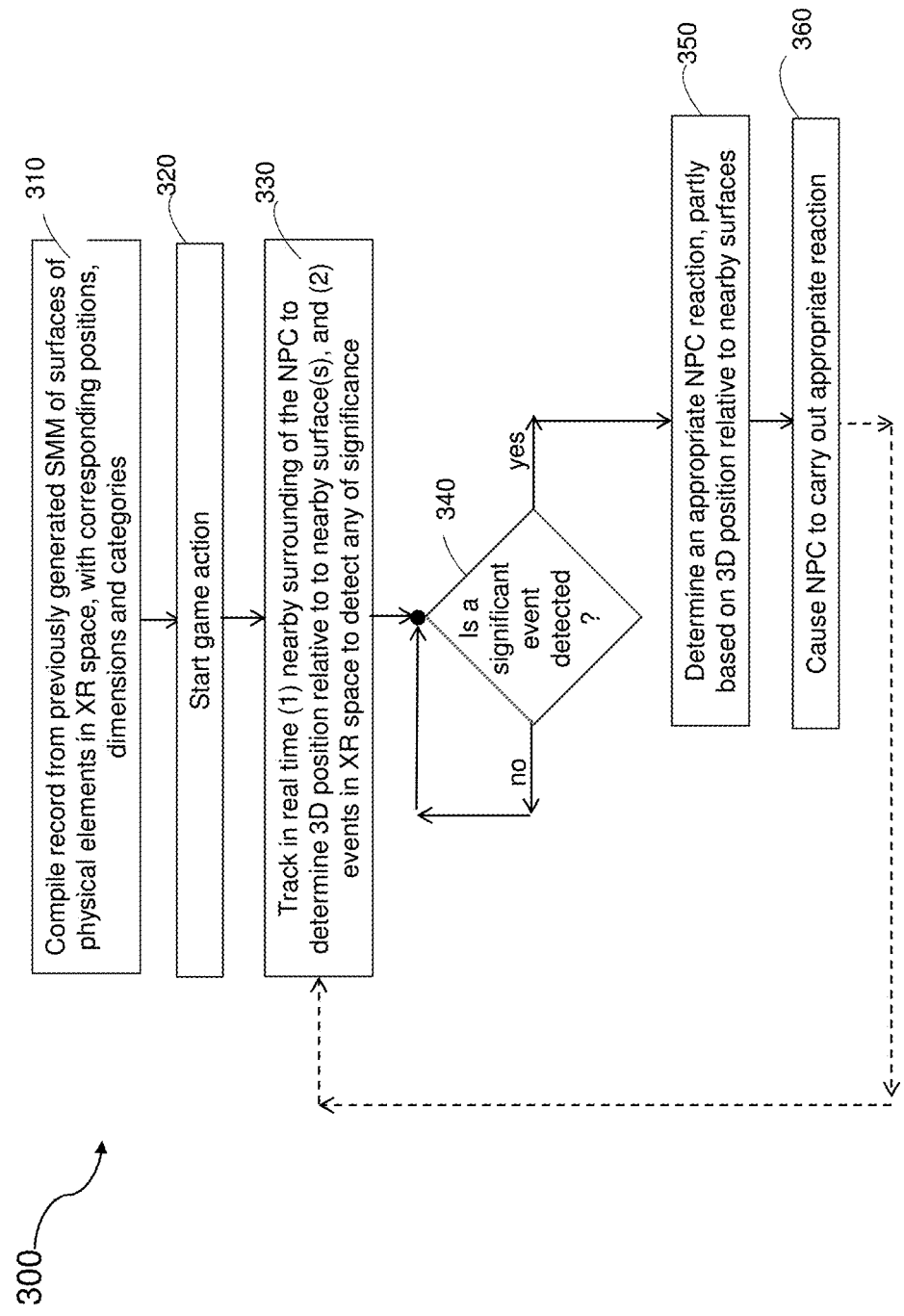
FIG. 3 is a flowchart of steps of a method according to some embodiments.

FIG. 3 is a flowchart illustrating steps of method 300 according to various embodiments of the present invention that could produce the type of results shown in FIG. 2.

At step 310, a record is compiled from a Spatial Mapping Mesh (SMM), previously generated using at least one of the devices discussed above, of a space in which the XR game (or other XR application) will be played. The SMM contains information on locations of myriad tiny portions of each surface the device can probe in its surroundings, so it is intrinsically limited to exposed surfaces, in the sense that only surfaces that are detectable by the technology used by the mapping device in question can be included. This information allows a listing of these surfaces' positions, dimensions, and probable categories (such as, for example, tabletop, chair, floor cushion, countertop, and wall) to be put together and used as a resource for later steps of the method.

At step 320, the game action starts.

At step 330, a pair of monitoring processes is initiated. One process tracks the position of the NPC relative to its nearby physical surroundings in the XR space. In some embodiments, "nearby" may be defined to mean within a few strides of the NPC, translating to a distance related to the NPC's size and mobility; a slow-moving dwarf may only need to seem aware of objects within 25 cm in any direction, for example, while 1m may be a more sensible distance for a giant, or a character that can move at high speed. In some embodiments, "nearby" may mean within easy reach for the NPC's outstretched arms. In yet other embodiments, "nearby" may be defined more generally as within a distance that is some fixed fraction of a dimension of the XR space, such as 20% of a room diagonal, for example. Limiting the spatial range over which separation from physical objects is monitored helps to keep use of computing resources relatively low.

Figure 4:
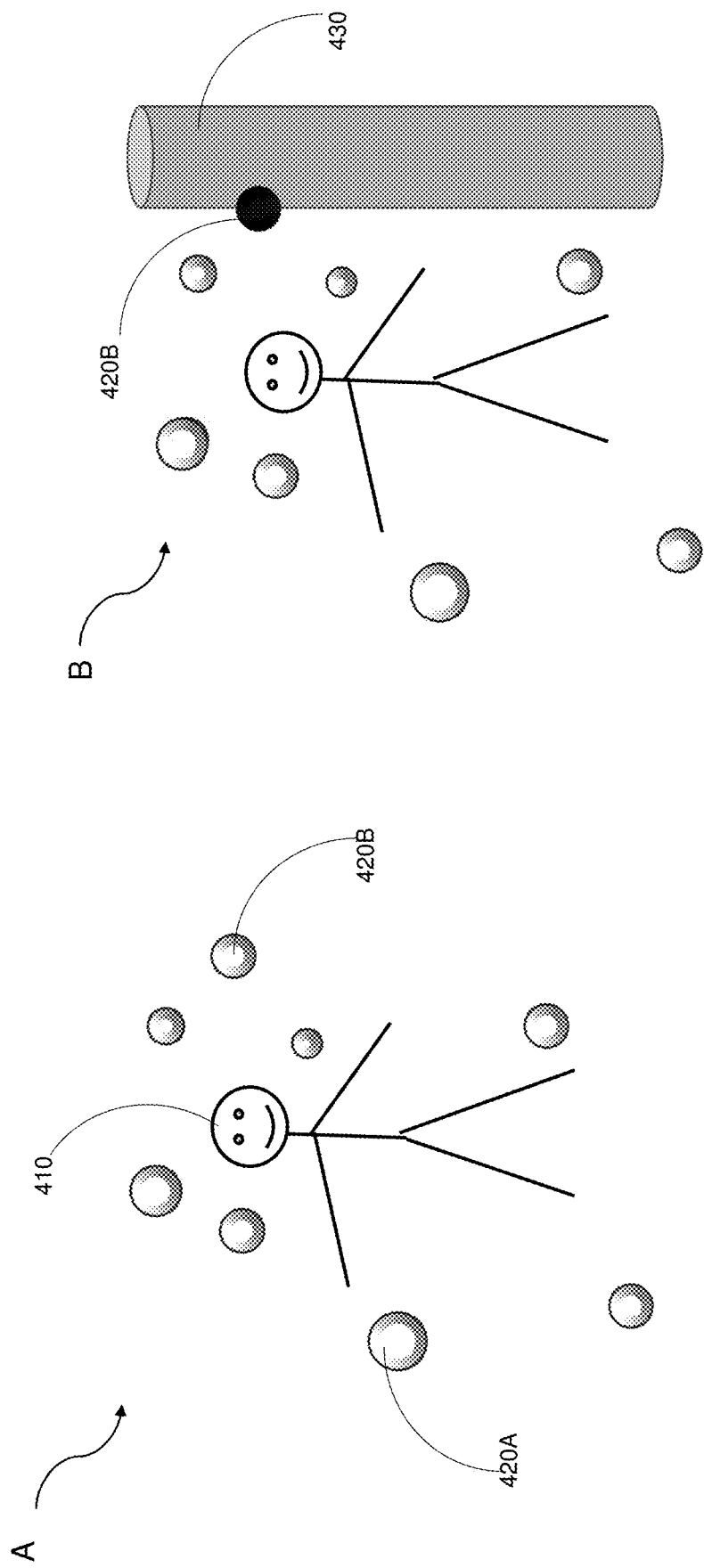
FIG. 4 illustrates the use of a cloud of collision objects to determine relative positioning of and NPC and nearby real elements according to some embodiments.

Some embodiments of the present invention use a cloud of collision objects to determine 3D position of the NPC relative to nearby surfaces. FIG. 4 illustrates schematically how this may be achieved. In both scenarios A and B, the NPC 410 is seen surrounded by a cloud of collision objects, two of which are labeled as 420A and 420B respectively. It should be noted that the collision objects are computational constructs that would not actually be displayed to the player of the game; they are made visible in FIG. 4 merely to illustrate the workings of the distance monitoring process. The collision objects are shown here as spheres at various known, different distances from the body of NPC 410, and at various known, different directions in 3D space, as their different apparent sizes in the figure are intended to roughly indicate. In different embodiments, there may be more or fewer collision objects than the 8 shown here in the figure, just as one possible example. In some cases, for example where a zombie or other monster is likely to confront an innocent character from the front, all or a majority of the collision objects are positioned behind the NPC, relative to the direction the character is facing, so they are most useful when the character is backing away from some dangerous presence, and cannot automatically "see" whether they are about to bump into a real physical surface.

Scenario A on the left of the figure is a simple representation of situations where there are no real physical elements close enough to an NPC to come into contact (collide) with any of the NPC's collision objects. Scenario B is a simple representation of situations where at least one of the collision objects (420B) does collide (as indicated here by a change of color from white to black) with a real physical element, in this case, a cylindrical pillar 430. Returning to step 330 of method 300, in situation B, the vector distance between NPC 410 and the nearest surface of the real pillar would be determined by the known vector distance between collision object 420B and NPC 410. So as soon as the first monitoring process detects the collision between 420B and element 430, it is known exactly where the pillar is situated relative to NPC 410.

Positioning the collision objects at a variety of vector distances from the NPC allows surfaces at a corresponding range of vector distances to be separately monitored.

In some embodiments, to be discussed in detail below, in response to detecting a collision between one of the collision objects and a surface of a physical element, the record of surfaces known to be present (because of the previously generated SMM of the XR space) is consulted to determine a category of the nearby colliding surface. As will be made clear in examples discussed above and below, the surface category may play an important part in determining an appropriate NPC reaction in relation to that surface.

Returning now to method 300, the second monitoring process occurring at step 330, substantially simultaneously with the first one discussed above, is carried out to detect events occurring in the XR space that are deemed sufficiently significant to warrant a reaction from one or more NPCs present. One type of event that may satisfy this requirement is the appearance of a hostile character, as discussed above with respect to FIG. 2. Other possible significant events may include the appearance of a mysterious character, an extreme meteorological phenomenon, a virtual explosion etc. What is deemed "significant" will typically be decided according to the nature of the game being played. The detection of these events may be as simple are keeping track of game action, and continuously comparing events as they unfold through the game with a predetermined list of events to be deemed "significant".

In some embodiments, the proximity of the NPC to an activity zone in the XR space at some instant in the game may be noted by the second monitoring process of step 330 and deemed to be a significant event. An activity zone in an XR space may be defined as a spatial region that includes one or more surfaces of one or more physical elements, where there is a natural association between that region and one or more activities that a character would be likely to perform there. As noted above, co-pending application Ser. No. 17/488,248 filed Sep. 28, 2021, describes ways in which an SMM may be used to predefine such zones. In the present invention, embodiments that include proximity to an activity zone as a significant event assume that a predefinition process has been carried out, so that if the NPC is determined to be positioned close to a surface that is part of a predefined activity zone, that proximity may be deemed to warrant a reaction.

In some embodiments, if and when a particular object—a principal character in the game, for example—comes into the field of view of the NPC, that is taken as an indication of a significant event, worthy of their reaction. One technique to establish what is in the field of view of an NPC is to use a raycast fan, with its apex at the NPC's face or facial region, and opening out in whichever direction the NPC is facing.

While the continuous processes of step 330 are being carried out, repeated assessments are made, at step 340, of whether a significant event has just occurred. If and when the assessment result is positive, method flow passes to step 350 at which an appropriate NPC reaction is determined. The determination is partly based on the NPC's 3D position relative to nearby surfaces, as established at step 30.

In some embodiments, an appropriate reaction may be chosen from a plurality of options, with the choice possibly being made according to the stage of the game. For example, as in the case discussed above with respect to FIG. 2, one option might be to run and hide in a suitable space between two nearby surfaces, while another might be to approach one of the surfaces and interact with a virtual object thereupon.

In some embodiments, the appropriate action is determined at least in part by a determined category of the nearby surface. For example, if the nearby surface is a wall, the appropriate reaction may be for the NPC to reach out and brace against it, or to move parallel to the wall in a direction that depends on the nature and the position of the significant event inspiring the reaction, or to try and climb over it, whereas if the nearest surface is a table, the appropriate reaction might be to crawl underneath it and hide.

In embodiments where the relative positioning of the NPC and nearby surfaces is tracked using a cloud of collision objects, as discussed above, the nearby surface is, of course, the colliding surface.

Figure 5:
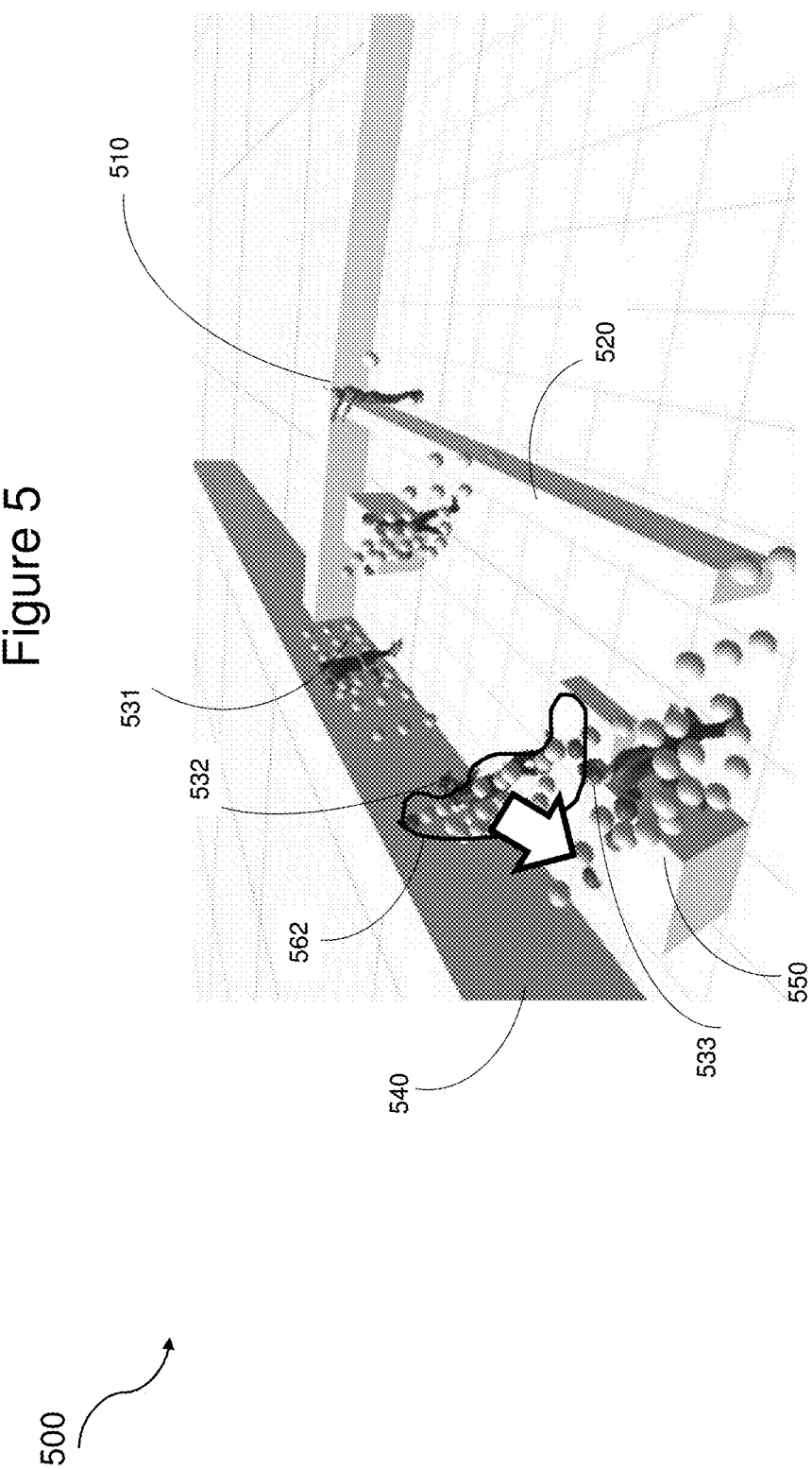
FIG. 5 illustrates an example of an XR space in which several NPCs are shown reacting to a significant event according to some embodiments.

FIG. 5 illustrates an example of an XR space 500 in which a frightening character 510 reaches threateningly over a partition 520 and is seen by 4 NPCs in the office space on the left of the figure. Two of the NPCs, 531 and 532, are standing fairly close to a left hand wall 540, while another NPC 533 is close to a desk 550. The cloud 562 of collision objects associated with NPC 532 is explicitly labeled, but each NPC has their own cloud of objects, shown here as white spheres, that darken if they actually collide with a nearby surface. Consider cloud 562, where one of the objects has turned black, showing that a real physical object (the wall) has been reached. NPC character 532 is therefore being directed to move in a direction other than towards that wall, specifically in the direction indicated by the solid white arrow.

Similarly, all the collision objects associated with NPC 531 are seen spreading over a portion of the nearby wall surface following prior collision (not shown) with that surface. In this case, the reaction of character 510, attempting to get away, but being prevented from moving straight back because of the wall, is to flatten themselves against the wall.

In embodiments where an event is defined to be significant if it comprises the NPC encountering (in the sense of coming into close proximity with) a predefined activity zone in the XR space, the appropriate action may be for the NPC to change orientation—the direction they are facing, and/or the direction in which they are moving —in order to enter the activity zone and then behave there in ways that a real character might. For example, if the NPC is moving past an empty chair seat pointed at 90 degrees to the NPC's direction of movement, the appropriate action might be for the NPC to turn to approach closer to the chair seat, and then turn around to sit in it.

Returning to method 300, at step 360, the NPC is simply directed to actually carry out the action that step 350 has determined to be an appropriate reaction to the significant event. Assuming the game is not yet over, method flow then returns to step 330, where tracking of NPC position and events of significance continues, and the loop through steps 340, 350 and 360 may be repeated, for as long as the game lasts.

In some cases, there may be two or more NPC in a given XR space, and it may be desirable for more than one of them to react to the occurrence of the same significant event. This may be enabled by communicating the detection of a significant event to all of the NPCs at substantially the same time, determining an appropriate reaction for each one, and directed them accordingly. In general, of course, the appropriate reaction for one NPC will be different from that for another, as each NPC will be in a different location, close to different surfaces of the real elements present in the XR space.

In some of these multi-NPC cases, a raycast fan may be used in the way described above, but for each of two or more of the NPCs, so that detection of a significant event occurring in the field of view of any one of those two or more can be communicated to some or all of the NPCs in the XR space.

Embodiments of the present invention provide many benefits. In general terms, methods described above allow a user of an XR environment, which may be a room, in the user's home or business premises for example, in which a spatial mapping mesh has been made, to experience a greater sense of immersion in that XR space than would otherwise be likely, by being able to see one or more NPCs in the game reacting in real time and in believable ways to surprising, interesting, or otherwise dramatic events as they unfold. More particularly, the reactions may involve an NPC interacting directly with real physical elements present in the XR space, close enough to the NPCs for the interactions to seem natural.

Embodiments described above are efficient in their use of computing resources by limiting tracking of relative positions of physical surfaces to only address those in the near neighborhood of the NPC, rather than trying to address all physical surfaces within the XR space. Carrying out the collision analysis process by means of a single cloud of collision objects for each NPC, with the positions of the collision objects kept at predetermined, relatively close separations from the NPC prior to collision, keeps the processor load to manageably low levels.

In some cases, the load may be further reduced by addressing only relatively large surfaces, as being most likely to be of interest, rather than addressing all surfaces identified in the SMM in the near neighborhood of the NPC. This may involve using batches of closely spaced collision objects within the cloud, and then only flagging a surface collision if more than a certain number within a batch collide with that surface at substantially the same time.

As noted earlier, the present invention is not limited to games alone, but could be used in navigation, shopping, or various other applications.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method to generate an appropriate action, by a non-player character (NPC) in a game being played in an XR space, in response to a significant event occurring in the game; the method comprising:
   compiling a record from a previously generated spatial mapping mesh (SMM) of surfaces of physical elements in the XR space, categorizing the surfaces into a first set of categories;
   after the game begins, tracking in real time:
   physical surroundings of the NPC in real time, allowing 3D positions of the NPC relative to physical surfaces positioned within a first range of vector distances from the NPC to be continuously determined; and
   events occurring in the game, allowing detection of any event deemed to be significant;
   wherein for each detected event deemed significant, occurring at a corresponding event time:
   an appropriate action is determined for the NPC to carry out in response to the detected significant event, based in part on whether the NPC is positioned within the first range of vector distances from a physical surface at the event time; and
   the NPC is directed to carry out the appropriate action.

2. The method of claim 1, wherein an event is deemed to be significant if the event could reasonably be expected, in context for the game being played, to inspire or provoke a reaction in an NPC present in the XR space.

3. The method of claim 1, wherein the first set of categories comprises at least one of: tabletop, countertop, seat, floor, and wall.

4. The method of claim 1, wherein if the significant event is an appearance in the XR space of a hostile character, the appropriate action comprises the NPC attempting to move away from the hostile character.

5. The method of claim 1, wherein tracking a position of the NPC in real time comprises using a cloud of collision objects, each collision object positioned at a separation from the NPC in the first range of distances.

6. The method of claim 5, wherein using a cloud of collision objects comprises:
   in response to detecting a collision between one of the collision objects and a surface of a physical element, consulting the record to determine a category of that surface.

7. The method of claim 6, wherein the appropriate action is determined at least in part by a determined category of that surface.

8. The method of claim 7, wherein if the determined category indicates that that surface is a wall, the appropriate action comprises one of: the NPC reaching an arm out to contact the wall, the NPC bracing one or both hands against the wall, and the NPC backing up towards the wall before moving laterally, parallel to the wall.

9. The method of claim 1, wherein if the significant event comprises the NPC encountering a predefined activity zone in the XR space, the appropriate action comprises adjusting orientation of the NPC and/or direction of movement of the NPC, such that the NPC enters the activity zone in a natural way and interacts with the activity zone in a natural way.

10. The method of claim 1, wherein tracking significant events comprises using a raycast fan, invisible to a user of the game, emanating from a facial region of the NPC, to detect a significant event occurring in a field of view of the NPC.

11. The method of claim 1,
    wherein the NPC is one of a plurality of NPCs;
    wherein tracking events comprises using a raycast fan, invisible to a user of the game, emanating from a facial region of each of the NPCs in the plurality to detect a significant event occurring in a field of view of any of the NPCs in the plurality; and
    wherein a detection of a significant effect is communicated among all the NPCs in the plurality.

12. The method of claim 11, wherein the communication of the detection of the significant event causes an appropriate reaction to be determined for and carried out by at least one other of the NPCs in the plurality.

13. A system for generating an appropriate action, by a non-player character (NPC) in a game being played in an XR space, in response to a significant event occurring in the game, the system comprising:
    one or more processors; and
    logic encoded in one or more non-transitory media for execution by the one or more processors and when executed operable to:
    compile a record from a previously generated spatial mapping mesh (SMM) of surfaces of physical elements in the XR space, categorizing the surfaces into a first set of categories;
    after the game begins, track in real time:
    physical surroundings of the NPC in real time, allowing 3D positions of the NPC relative to physical surfaces positioned within a first range of vector distances from the NPC to be continuously determined; and
    events occurring in the game, allowing detection of any event deemed to be significant;
    wherein for each detected event deemed significant, occurring at a corresponding event time:

an appropriate action is determined for the NPC to carry out in response to the detected significant event, based in part on whether the NPC is positioned within the first range of vector distances from a physical surface at the event time; and the NPC is directed to carry out the appropriate action.

14. The system of claim 13, wherein an event is deemed to be significant if the event could reasonably be expected, in context for the game being played, to inspire or provoke a reaction in an NPC present in the XR space.

15. The system of claim 13, wherein the first set of categories comprises at least one of: tabletop, countertop, seat, floor, and wall.

16. The system of claim 13, wherein if the significant event is an appearance in the XR space of a hostile character, the appropriate action comprises the NPC attempting to move away from the hostile character.

17. The system of claim 13, wherein tracking a position of the NPC in real time comprises using a cloud of collision objects, each collision object positioned at a separation from the NPC in the first range of distances.

18. The system of claim 17, wherein using a cloud of collision objects comprises:

in response to detecting a collision between one of the collision objects and a surface of a physical element, consulting the record to determine a category of that surface.

19. The system of claim 18, wherein the appropriate action is determined at least in part by a determined category of that surface.

20. The system of claim 19, wherein if the determined category indicates that that surface is a wall, the appropriate action comprises one of: the NPC reaching an arm out to contact the wall, the NPC bracing against the wall, and the NPC backing up towards the wall before moving laterally, parallel to the wall.

* * * * *